(12) United States Patent
Qiu et al.

(10) Patent No.: US 11,973,824 B2
(45) Date of Patent: Apr. 30, 2024

(54) METHOD FOR DATA TRANSMISSION OF AUDIO AND VIDEO IN END-TO-END SYSTEM

(71) Applicant: SHANGHAI ANVIZ TECHNOLOGY CO., LTD., Shanghai (CN)

(72) Inventors: Chenglin Qiu, Shanghai (CN); Weijun Wang, Shanghai (CN)

(73) Assignee: SHANGHAI ANVIZ TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 18/096,142

(22) Filed: Jan. 12, 2023

(65) Prior Publication Data
US 2023/0144294 A1 May 11, 2023

Related U.S. Application Data

(63) Continuation of application No. PCT/CN2022/020953, filed on Sep. 23, 2022.

(30) Foreign Application Priority Data

Sep. 23, 2021 (CN) .......................... 202111117683.5

(51) Int. Cl.
H04L 67/1031 (2022.01)
H04L 65/1073 (2022.01)
H04L 67/1008 (2022.01)

(52) U.S. Cl.
CPC ...... H04L 67/1031 (2013.01); H04L 65/1073 (2013.01); H04L 67/1008 (2013.01)

(58) Field of Classification Search
CPC ............. H04L 67/1031; H04L 65/1073; H04L 67/1008; H04L 65/1059
See application file for complete search history.

(56) References Cited

U.S. PATENT DOCUMENTS 10,728,121 B1* 7/2020 Chitalia .............. H04L 41/0894
11,522,840 B2* 12/2022 Sillankorva ........... H04L 9/0643
(Continued)

FOREIGN PATENT DOCUMENTS

CN 103442224 A 12/2013
CN 103581740 A 2/2014
(Continued)

OTHER PUBLICATIONS

International Search Report Corresponding to Related Application No. PCT/CN2022/120953; dated Dec. 12, 2022; 4 pgs.

*Primary Examiner* — Jimmy H Tran
(74) *Attorney, Agent, or Firm* — Cooper Legal Group, LLC

(57) ABSTRACT

Disclosed is a method for data transmission of audio and video in an end-to-end system. The end-to-end system includes a client terminal, a device terminal, and a service terminal. The service terminal includes a management server, a register server and a transmission server. The method includes steps of: S1: adding the transmission server to the management server; S2: adding the device terminal to the management server; S3: starting and initializing the device terminal; S4: starting the client terminal and connecting the client terminal to the device terminal; S5: performing an overload processing in the transmission server; S6: performing an overload recovering in transmission server.

13 Claims, 10 Drawing Sheets

(56) References Cited

U.S. PATENT DOCUMENTS

| | | | | |
|---|---|---|---|---|
| 2003/0028642 A1* | 2/2003 | Agarwal | H04L 69/329 | 709/224 |
| 2003/0108002 A1* | 6/2003 | Chaney | H04L 65/1101 | 370/261 |
| 2004/0103149 A1* | 5/2004 | Tanigawa | H04L 12/1818 | 709/204 |
| 2008/0274739 A1* | 11/2008 | Wu | H04L 65/80 | 455/435.1 |
| 2009/0180484 A1* | 7/2009 | Igarashi | H04N 21/6408 | 370/401 |
| 2009/0232129 A1* | 9/2009 | Wong | H04M 7/0024 | 370/352 |
| 2009/0313376 A1* | 12/2009 | Cedervall | H04L 69/24 | 709/227 |
| 2010/0005177 A1* | 1/2010 | Cagenius | H04N 21/6408 | 709/228 |
| 2010/0268783 A1* | 10/2010 | Mizosoe | H04N 21/47202 | 709/219 |
| 2011/0151864 A1* | 6/2011 | Byun | H04W 40/16 | 455/445 |
| 2011/0191462 A1* | 8/2011 | Smith | H04L 47/70 | 709/224 |
| 2013/0170492 A1* | 7/2013 | Lu | H04L 12/4625 | 370/392 |
| 2013/0188519 A1* | 7/2013 | Lu | H04L 12/6418 | 370/254 |
| 2013/0201987 A1* | 8/2013 | Lu | H04L 45/74 | 370/392 |
| 2013/0208592 A1* | 8/2013 | Lu | H04L 47/30 | 370/231 |
| 2013/0282798 A1* | 10/2013 | McCarthy | H04L 41/0806 | 709/203 |
| 2015/0128199 A1* | 5/2015 | Kuo | H04L 65/1069 | 709/204 |
| 2019/0141121 A1* | 5/2019 | Bernat | H04L 41/5051 | |
| 2019/0158544 A1* | 5/2019 | Ohneck | H04L 65/1069 | |
| 2019/0278938 A1* | 9/2019 | Greene | H04L 41/40 | |
| 2019/0039417 A1 | 12/2019 | Hikita et al. | | |
| 2019/0394174 A1* | 12/2019 | Sillankorva | H04L 9/0643 | |
| 2020/0110753 A1* | 4/2020 | Silk | G06F 9/451 | |
| 2020/0133827 A1* | 4/2020 | Tkac | G06F 9/455 | |
| 2020/0228602 A1* | 7/2020 | Spoczynski | H04L 67/56 | |
| 2020/0267053 A1* | 8/2020 | Zheng | H04L 67/1008 | |
| 2020/0296155 A1* | 9/2020 | McGrath | G06F 9/5027 | |
| 2020/0366733 A1* | 11/2020 | Parvataneni | H04L 67/34 | |
| 2020/0389516 A1* | 12/2020 | Parekh | G06F 9/5077 | |
| 2021/0194847 A1* | 6/2021 | Gu | H04L 61/2503 | |
| 2021/0326161 A1* | 10/2021 | Son | G06F 9/5072 | |
| 2022/0006701 A1* | 1/2022 | Patel | H04L 41/22 | |
| 2022/0171647 A1* | 6/2022 | Mutha | H04L 41/0816 | |
| 2022/0210073 A1* | 6/2022 | Bernat | H04L 47/125 | |
| 2022/0255916 A1* | 8/2022 | Smith | H04L 9/3247 | |
| 2022/0322058 A1* | 10/2022 | Etuke | H04W 12/088 | |
| 2022/0330128 A1* | 10/2022 | Kim | H04W 36/0011 | |
| 2022/0369166 A1* | 11/2022 | Soryal | H04L 63/0876 | |
| 2023/0144294 A1* | 5/2023 | Qiu | H04L 65/1059 | 709/203 |

FOREIGN PATENT DOCUMENTS

| | | |
|---|---|---|
| CN | 106331115 A | 1/2017 |
| CN | 207820121 U | 9/2018 |
| CN | 113099252 A | 7/2021 |
| CN | 113824723 A | 12/2021 |

\* cited by examiner

METHOD FOR DATA TRANSMISSION OF AUDIO AND VIDEO IN END-TO-END SYSTEM

CROSS-REFERENCE TO RELATED APPLICATION

The present application is a continuation of PCT application No. PCT/CN2022/120953, filed on Sep. 23, 2022, which claims the priority benefit of a China patent application No. 202111117683.5, filed on Sep. 23, 2021. The entireties of PCT application No. PCT/CN2022/120953 and China patent application No. 202111117683.5 are incorporated herein by reference and made a part of this specification.

TECHNICAL FIELD

The present application relates to the technical field of communication, and in particular to a method for data transmission of audio and video in an end-to-end system.

BACKGROUND

The present RTP, RTMP, WEBRTC, http and so on are audio/video frequency transmission technology which is widely used at present time, audio/video frequency transmission technology is promoted by the rise of professional video surveillance field and Online video business, which varies in development degrees in their respective field, compared with the professional surveillance field, the Online video business grew more rapidly.

RTP technology which is widely used in the product of professional video surveillance, owing to the usual deployment of the professional surveillance product in private network, and the smaller interference of private network compared with complex WAN, became the standard transfer protocol in professional surveillance field; RTMP protocol is often used in demand of WAN Video Websites, as the standard protocol of video playback of FLASH plugin (FLASH is eliminated at present time); http protocol is extraordinary obsolescence, but under the boost of the demand to online audio/video, a great amount of video data is transferred by means of file via http protocol, the desired effect is achieved by ceaselessly promoting the performance and the belt width of the server; WEBRTC protocol is the most popular video transfer protocol at present time, which features in point to point, to transfer audio/video streaming in real time.

Surveillance products are mainly used in professional surveillance flied, which consistently use technology like RTP etc. and is totally in different technical route with mainstream video website, since the surveillance products gradually enters personal consumption market, some of the surveillance products in consumer market faces to various incompatible issues, the mainstream solution is using cloud server to storage and forward the data, which satisfies the usage experience of client at present time, however as the products have been ceaselessly marketed, the high cost of video data forwarding became a mainly problem, the surveillance video products are designed to be used in one Private LAN, but the users expect to see videos anywhere. At first, the product shall be able to transfer data in WAN environment. The transfer problem of internet data can be solved by increasing the server, which brings huge cost pressure at the same time, a great amount of data are generated by the surveillance video products every time, forwarding all of them by server, may cause dramatic increase of operation costs, while large delay will be caused when the data is sent after being in storage as files.

Therefore, a solution method for end-to-end system applying to the data transmission of audio/video frequency should be designed, by a self designed software service architecture, the quantity of server is decreased in same condition, the hardware requirement of the server is decreased, so that the operation cost is decreased, the tolerance of whole software system is promoted, the effect of downtime and network anomaly to the system is decreased, total data transmission volume of whole system is reduced by a new transfer mode of message, so that a transmission cost of data is reduced.

SUMMARY

The purpose of the present application is to overcome the shortage of prior art, a method for data transmission of audio and video in an end-to-end system, by a self designed software service architecture, the quantity of server is decreased in same condition, the hardware requirement of the server is decreased, so that the operation cost is decreased, the tolerance of whole software system is promoted, the effect of downtime and network anomaly to the system is decreased, total data transmission volume of whole system is reduced by a new transfer mode of message, so that a transfer cost of data is reduced.

To achieve above purpose, the present application provides a method for data transmission of audio and video in an end-to-end system, the end-to-end system includes a client terminal, a device terminal, and a service terminal, the service terminal comprises a management server, a register server and a transmission server, and the method includes steps of:
S1: adding the transmission server to the management server;
S2: adding the device terminal to the management server;
S3: starting and initializing the device terminal;
S4: starting the client terminal and connecting the client terminal to the device terminal;
S5: performing an overload processing in the transmission server;
S6: performing an overload recovering in transmission server.
In some embodiment, the step S1 includes sub-steps of:
S101: adding, by a user, the transmission server on a configuration page of the management server;
S102: saving, by the management server, configuration information to a database;
S103: submitting, by the management server, a creating server application via a cloud service operator;
S104: completing, by the cloud service operator, a creation and a start-up of a new server;
S105: sending, by the new server after the start-up, a register request to a management server;
S106: updating, by the transmission server, transmission service information to the register server.
In some embodiment, the step S2 includes sub-steps of:
S201: adding, by a user, the device terminal on a configuration page of the management server;
S202: saving, by the management server, the added device terminal to a database;
S203: updating, by the transmission server, device information to the register server.

In some embodiment, the S3 includes sub-steps of:

S301: starting the device terminal, and sending, by the device terminal, a register information query message to the register server to obtain a transmission server list corresponding to the device terminal;

S302: after the device terminal obtaining the transmission server list, sending, by the device terminal, a register request to the transmission server, and after receiving a registration reply message from the transmission server, completing the registration;

S303: after the registration of the device terminal to the transmission server is completed, sending, by the device terminal, a heartbeat message to the transmission server; a heartbeat reply message sent by the transmission server comprises overload information of the transmission server; when overload information of the transmission server is received by the device terminal for 3 times, sending, by the device terminal, a registration query message to the register server, and when the transmission server list changes, performing the initialization once again.

In some embodiment, the S4 includes sub-steps of:

S401: sending, by the client terminal, a query request for querying transmission server information associated with the device terminal to the register server;

S402: returning, by the register server, the transmission server information of a specified device terminal;

S403: sending, by the client terminal, a query request to the transmission server;

S404: sending, by the transmission server, a query response to the client terminal;

S405: forwarding, by the transmission server, the query request of the client terminal to the device terminal;

S406: after the client terminal receiving the query response from the transmission server, sending, by the client terminal, a probe message to the device terminal;

S407: after the device terminal receiving the query request forwarded by the transmission server, sending, the device terminal, a probe message to the client terminal;

S408: when the probe message from the device terminal is received by the client terminal, initiating, by the client terminal, a connection request to the device terminal;

S409: when the device terminal receiving the connection request from the client terminal, sending, by the device terminal, a connection request response message, wherein a connection establishment is completed when the client terminal receiving the connection request response message;

S410: when the client terminal does not receive the probe message from the device terminal overtime, sending, by the client terminal, a forwarding connection request to a forwarding server;

S411: when the forwarding server receiving the forwarding connection request, establishing, by the forwarding server, a forwarding channel to send the forwarding connection request to the device terminal;

S412: when the device terminal receiving the forwarding connection request from the forwarding server, sending, by the device terminal, a response message;

S413: receiving, the client terminal, the forwarding connection request from the forwarding server to complete a connection establishment.

In some embodiment, the S5 includes sub-steps of:

S501: when the transmission server forwards an excessive amount of data or has an excess number of load devices, sending, by the transmission server, an overload message to the management server;

S502: when the transmission server forwards an excessive amount of data or has an excess number of load devices, sending, by the transmission server, a load over-high message to all connected device terminal;

S503: transferring, by the management server, the device terminal of the transmission server with a high load to a transmission server with a low load, and updating the register server with a modified device information list;

S504: after a load over-high message is received by the device terminal for many times, re-requesting, by the device terminal, a device information list to obtain a new transmission server;

S505: migrating, by the device terminal, to a new transmission server with a low load.

In some embodiment, in the S6, when a forward link established by the transmission server for a client terminal and a device terminal is terminated, releasing, by the transmission server, a source; when the source of the transmission server reaches a low load threshold, sending, by the transmission server as a low load server, a state message to the management server, and transferring, by the management server, a part of device terminals to the low load transmission server.

In some embodiment, the management server adopts a standard website architecture design, which is divided into a front end, a back end and database, the front end is configured for providing a configuration management page to users, the back end is configured for processing a configuration message and a data interaction with other servers, the database is configured for storing device information.

In some embodiment, the register server is configured for providing transmission server association information of corresponding device queried by the client terminal and the device terminal.

In some embodiment, the register server is configured for providing a high concurrency query service and an update service, the high concurrency query service is configured for providing a query function support to the client terminal and the device terminal, the update service is configured for interacting with the management server by using a http protocol to obtain a device list and a transmission server list.

In some embodiment, the transmission server is configured for performing a dynamic adjustment according to number of device terminals, when the transmission server is overload or a large number of transmission servers are idle, the management server is configured for dynamic increasing and decreasing number of the transmission servers via a server operator interface.

In some embodiment, the transmission server has functions of a network penetration, a forwarding service and an update service, the function of update service is the same as that of the register server, which is configured for providing information interaction with the management server.

In some embodiment, the client terminal is configured for providing an external program call in a runtime, and completing a connection establishment and a transmission for audio and video via an API interface of the client terminal.

In some embodiment, the device terminal is configured for providing an external program call in a runtime, completing a connection establishment and a transmission for audio and video via an API interface of the device terminal.

Compared with prior art, by adopting an unique architecture design of the client terminal, the device terminal and the service terminal, the present application make the user only need to call the API interface provided by the client terminal and the device terminal to implement a data transmission of real-time audio/video frequency, as well as configure and manage related device quickly via the management server. By a configuration, the system can adaptively adjust, increase and decrease the server to adapt current business demands according to the load, which has following technical benefits that: the solution decreases the transmission cost of data, which effectively decrease the error caused by server downtime and network problem and has a greater reliability compared with prior solution; by a self-generated adjustment to the serve amount of the load in the system, the cost of idle server is decreased, which may realize a comprehensive system management to the device and reduce maintenance costs.

DESCRIPTION OF THE EMBODIMENTS

The present application will be further described in detail in combination with FIGS.

Figure 1:
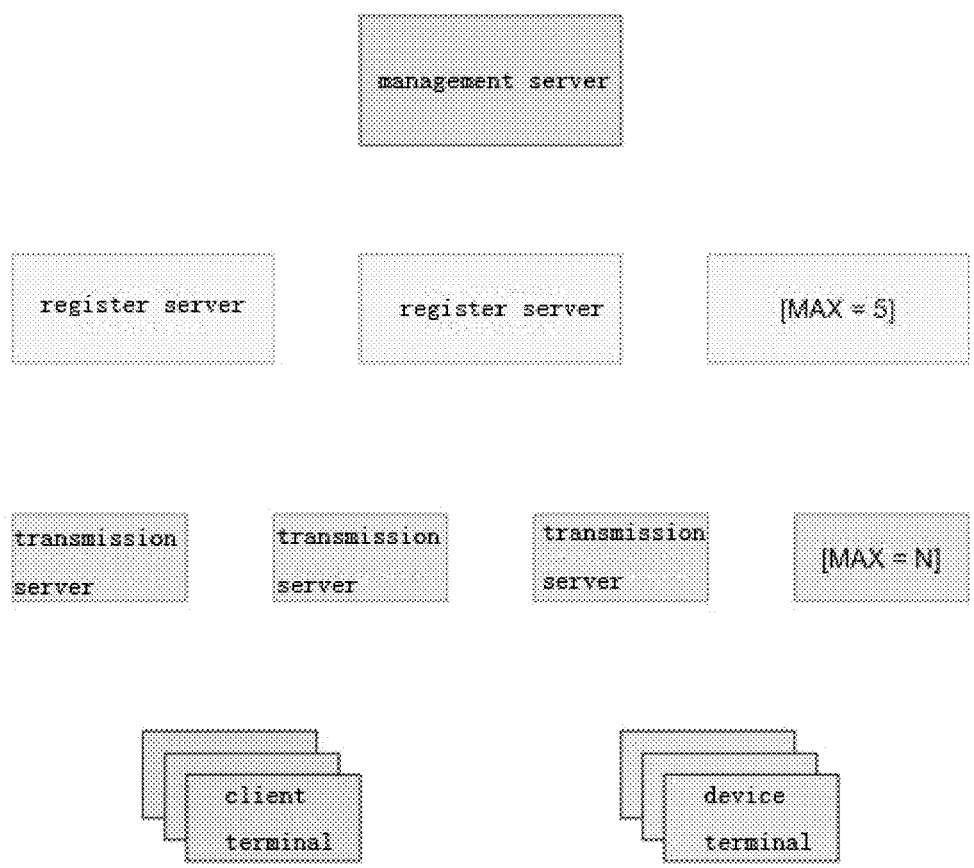
FIG. 1 is a schematic diagram of the overall architecture of present application.
Figure 2:
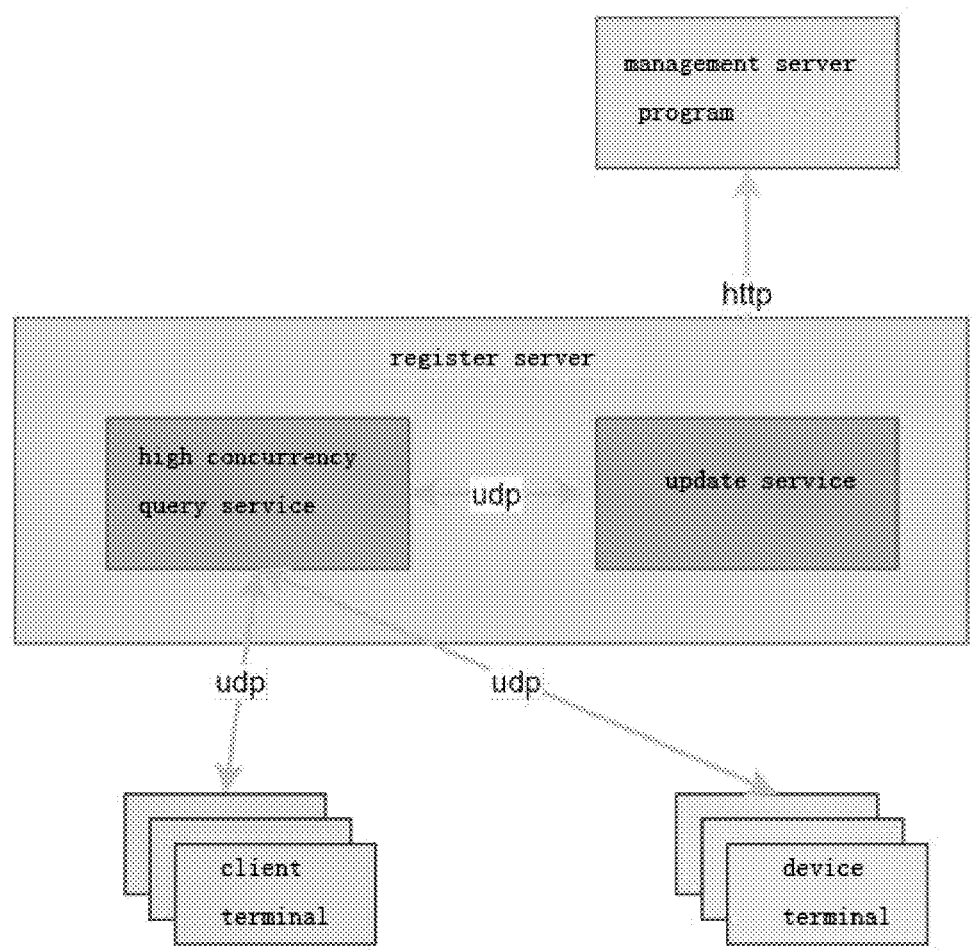
FIG. 2 is a schematic diagram of architecture of the register serve in present application.

Referring to FIGS. 1 and 2, the present application provides a solution method for end-to-end system applying to the data transmission of audio/video frequency, the solution method for end-to-end system represents a method for the solution of audio/video frequency data transmission between the client terminal and the device terminal. The end-to-end system includes a client terminal, a device terminal, and a service terminal, the service terminal includes a management server, a register server and a transmission, the method includes steps of:
S1: adding the transmission server to the management server;
S2: adding the device terminal to the management server;
S3: starting and initializing the device terminal;
S4: starting the client terminal and connecting the client terminal to the device terminal;
S5: performing an overload processing in the transmission server;
S6: performing an overload recovering in transmission server.

The S1 includes following steps:
S101: adding, by a user, the transmission server on a configuration page of the management server, generating configuration information by the management server, in which the management server will be triggered by a message, to run whole logic automatically, which represents the step S101 to the step S106, when is configured to add automatically;
S102: saving a configuration information to a database by the management server;
S103: submitting a creating server application via a cloud service operator by the management server;
S104: completing a creation and a start-up of a new server by the cloud service operator, in which the new server is a newly established transmission server;
S105: sending a register request to a management server by the new server after the start-up;
S106: generating a transmission service information based on the register request and updating the transmission service information to all of the register server by the transmission server, in which the transmission service is configured to represent the connection relationship between the transmission server and the register server Referring to FIGS. 6 and 7, the S2 includes following steps:
S201: adding (modifying/deleting) the device terminal via a configuration page of the management server by the user;
S202: saving the added (modified/deleted) device terminal to a database by the management serve, to generate device information.
S203: updating the device information to all of the register servers by the transmission server.

The S3 includes following steps:
S301: starting the device terminal, sending a register information query message to the register server first, obtaining a transmission server list corresponding to the device terminal, in which the transmission server is configured to represent a transmission server list that can be connected with device terminal, when the device terminal is starting;
S302: after obtaining the transmission server list by the device terminal, sending a register request to the transmission server, after the a reception of registration reply message of the transmission server, completing the registration;
S303: after the register of the device terminal to the transmission server, sending a heartbeat message to the transmission server every 15 seconds, the heartbeat message sent by transmission server including an overload information of the transmission server, in which the overload information of the transmission server is configured to show whether the transmission server is overload, under the condition that the overload information is received by the device terminal for 3 times, resending a registration query message to the register server, under the condition that the transmission server list changes, executing a initialization process once again, in which the initialization process is step S302 to step S303.

Figure 9:
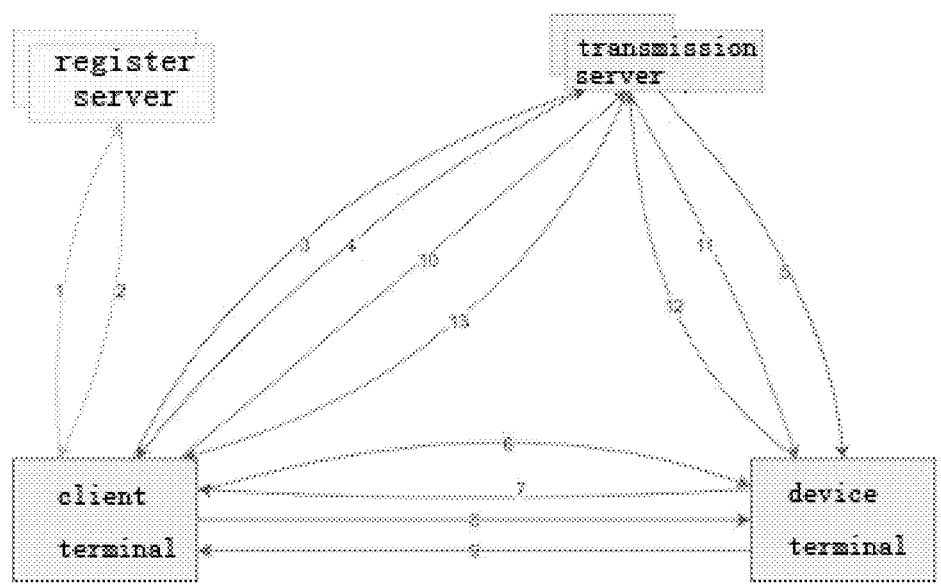
FIG. 9 is a first schematic diagram of starting and connecting the device terminal by the client terminal according to present application.
Figure 10:
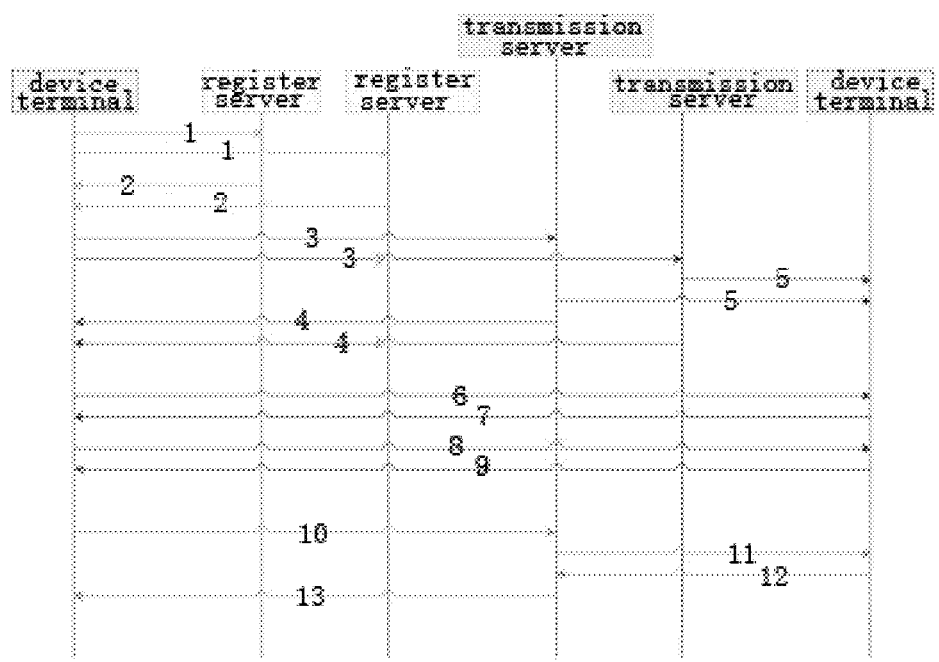
FIG. 10 is a second schematic diagram of starting and connecting the device terminal by the client terminal according to present application.

Referring to FIGS. 9 and 10, the S4 includes following steps:

S401: sending, by the client terminal, a query request for querying transmission server information associated with the device terminal to the register server.

S402: returning, by the register server, the transmission server information of a specified device terminal:

S403: sending a query request to the transmission serve by the client terminal;

S404: sending a query response to the client terminal by the transmission server;

S405: forwarding the query request of the client terminal to the device terminal by the transmission server;

S406: after the client terminal receiving the query response from the transmission server, sending, by the client terminal, a probe message to the device terminal;

S407: after the device terminal receiving the query request forwarded by the transmission server, sending, by the device terminal, a probe message to the client terminal;

S408: when the probe message from the device terminal is received by the client terminal, initiating, by the client terminal, a connection request to the device terminal;

S409: when the device terminal receiving the connection request from the client terminal, sending, by the device terminal, a connection request response message, wherein a connection establishment is completed when the client terminal receiving the connection request response message;

S410: when the client terminal does not receive the probe message from the device terminal overtime, sending, by the client terminal, a forwarding connection request to a forwarding server; in particular, the forwarding server is a transmission server corresponding to the specific device terminal;

S411: when the forwarding server receiving the forwarding connection request, establishing, by the forwarding server, a forwarding channel to send the forwarding connection request to the device terminal;

S412: when the device terminal receiving the forwarding connection request from the forwarding server, sending, by the device terminal, a response message;

S413: receiving, the client terminal, the forwarding connection request from the forwarding server to complete a connection establishment.

Figure 5:
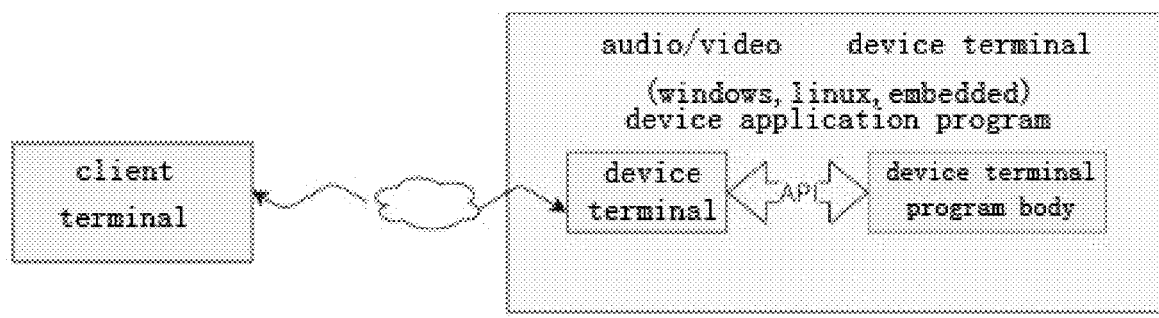
FIG. 5 is a schematic diagram of the device terminal interface according to present application.
Figure 6:
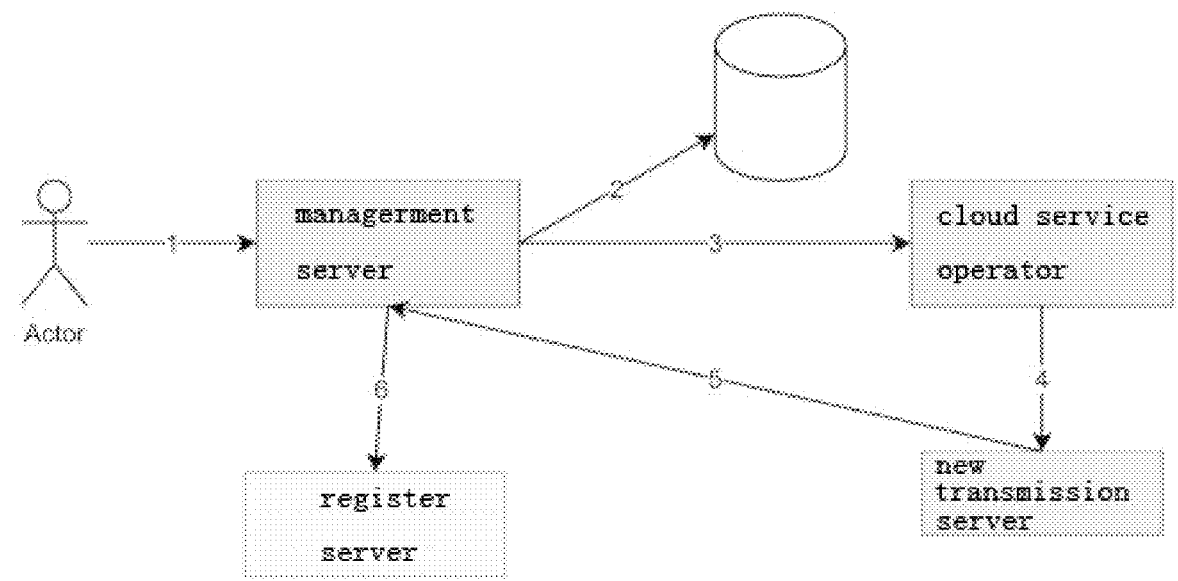
FIG. 6 is a schematic diagram of adding the transmission server to the management server according to present application.
Figure 7:
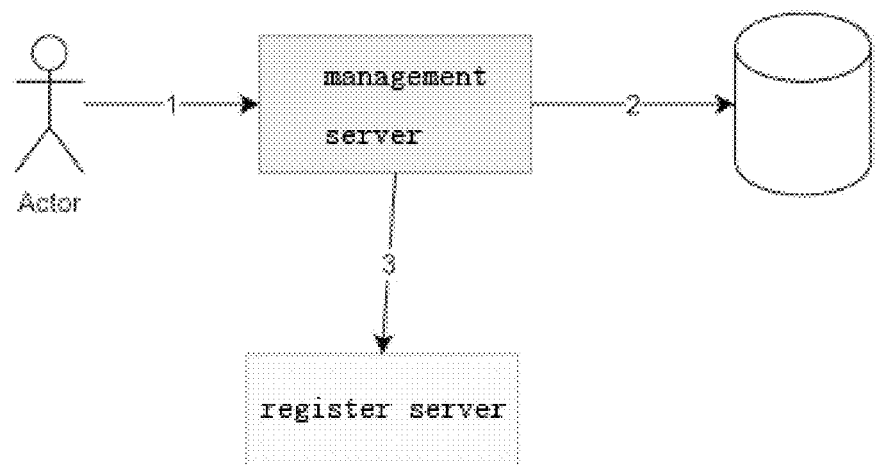
FIG. 7 is a schematic diagram of adding the device terminal to the management server according to present application.
Figure 11:
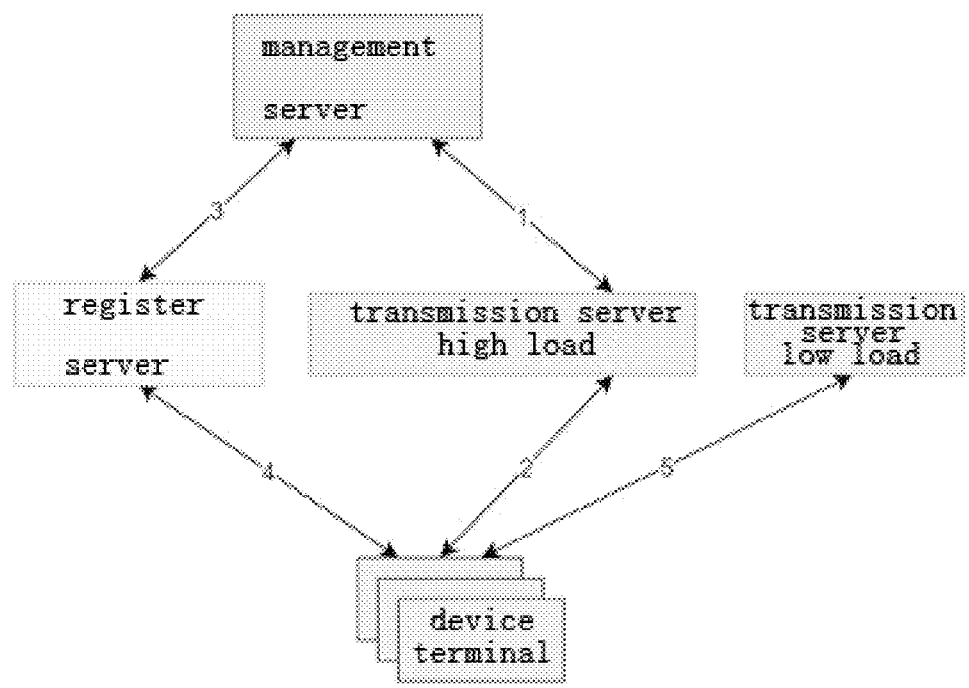
FIG. 11 is a schematic diagram of dealing with the overload of the transmission server according to present application.

Referring to FIGS. 5, 6 and 11, in the S5, the transmission server provides assistance of penetration connection for the client terminal and the device terminal. When a unsuccessful penetration is caused by the network restrictions of the client terminal and the device terminal, the transmission server provides data forwarding service, which includes following step:

S501: when the transmission server forwards an excessive amount of data or has an excess number of load devices, sending, by the transmission server, an overload message to the management server; the load device of the transmission server represents to the device terminal which is connected to the transmission device and in data transmission via it. When the forwarded data or the load device of the transmission server is in a high amount, the transmission server is a high load transmission server. That the forwarded data or the load device of the transmission server is in a high amount means that the forwarded data amount of the transmission server is higher than or equal to a preset data amount threshold, or the load device amount of the transmission is higher than or equal to a preset load amount threshold. The low load transmission server particularly means a transmission server which has a forwarded data amount that is smaller than the preset data amount threshold and a load device amount that is smaller than the preset load amount threshold.

S502: when the transmission server forwards an excessive amount of data or has an excess number of load devices, sending, by the transmission server, a load over-high message to all connected device terminal (except the device terminals that had established forwarding).

S503: transferring, by the management server, the device terminal of the transmission server with a high load to a transmission server with a low load, and updating the register server with a modified device information list; particularly, device information list is configured to map the connection relationship between device terminal and the transmission server.

S504: after a load over-high message is received by the device terminal for many times, re-requesting, by the device terminal, a device information list to obtain a new transmission server; particularly, consecutive multiple reception of the load over-high message by the device terminal represents to the reception frequency of the load over-high message is larger than a preset frequency threshold;

S505: migrating, by the device terminal, to a new transmission server with a low load;

In the S6, when a forward link established for a client terminal and a device terminal by the transmission server stops, releasing a source of the transmission server, under the condition that the source reaches a low load threshold, sending a state message to the management server by the transmission server as a low load server, transferring part of the device terminals to the low load server by the management server, particularly, the part of the device terminals which are transferred are random device terminals.

The present application has high expandability, all servers can be run on one PC hard ware platform when a minimum service is provided, when the amount of the device terminal gradually increases, the servers are gradually registered, the transmission servers are deployed in sequence on the independent PC hardware platform, in combination of hardware upgrade function provided by present cloud service operators such as Amazon and Ali etc., the system can be upgraded very quickly and smoothly.

The management server adopts a standard website architecture design, which is divided into front end, back end and database, the front end provides a configuration management page to the user, the back end completes a configuration message processing and a data processing of the interaction with other server, the database is configured to store device information, such as information of device terminal. The management server runs on the host of the cloud service operator by means of stand-alone program. The data storage adapts mysql database. The manager server provides for user configuration management by means of standard http.

The register server provides information of corresponding equipment queried by the client terminal and the device terminal relating to the transmission server. The related information has large concurrent and short character string. The register server runs on the host of the cloud service operator by means of stand-alone program. The register server doesn't have database, after start, all data of register server are obtained from the management server, and the service is provided after obtaining the data from the management server.

The register server includes a high concurrency query service and an update service. The high concurrency query service provides query function support for the client terminal and device terminal, the service features on high concurrency and short data (84 bytes) of each message; an http protocol is adopted for interaction with management server in the update service, to obtain a device list and a transmission server list. Mainstream http server, compared with high concurrency query service, requires to be in TCP three way handshake for each transmission, in which actual data will increase http protocol header information, every request service should be allocated independent memory for tcp data processing, and memory will be consumed before the connection ends, so that dealing with high concurrency request by means of http service requires to establish a group of service for processing. On the contrary, an udp is adopted in present solution, the service terminal has no need to allocate independent memory for each connection, and the handshake is not needed in udp data transmission. The amount of data transmission has more than 50% reduction, and the performance requirement of server hardware has more than 50% reduction.

A plurality of register servers and management server runs independently, which improves fault tolerance of the whole system. Unless all of the register servers are in downtime, the system can still ensure its normal running Compared with traditional fault tolerance solution which is using backup server, firstly a plurality of register servers separately deployed in multiple locations can effectively decrease the connection delay cause by area difference, and then all register servers backup each other. Besides, even if traditional backup server is not in the operating state, a cost should be paid for it. All register servers in present system are deployed in different areas, which reduces the probability of abnormal running in the system caused by regional network paralysis.

The register server can implement the device information list request to the management server, the state message upload the management server, in which the state message includes information such as a load of register server, a requests-per-second, and a CPU/memory utilization, the reception of a device information list update request from the management server (after the system administrator conducts an operation of adding/deleting/modifying, the management server sends the updated device information to the register server), the reception of device query request from the client terminal and the reception of device query request from the device terminal.

For example, if only used in China, 1 server can be configured, if used in Asia, 2 servers can be configured, if a global data should be loaded, each area such as Asia, Europe, Africa, North and South America can be configured 1 server according to geography, which depends on a central node of global backbone network. More register servers can contribute to a faster response got by nearby device.

Figure 3:
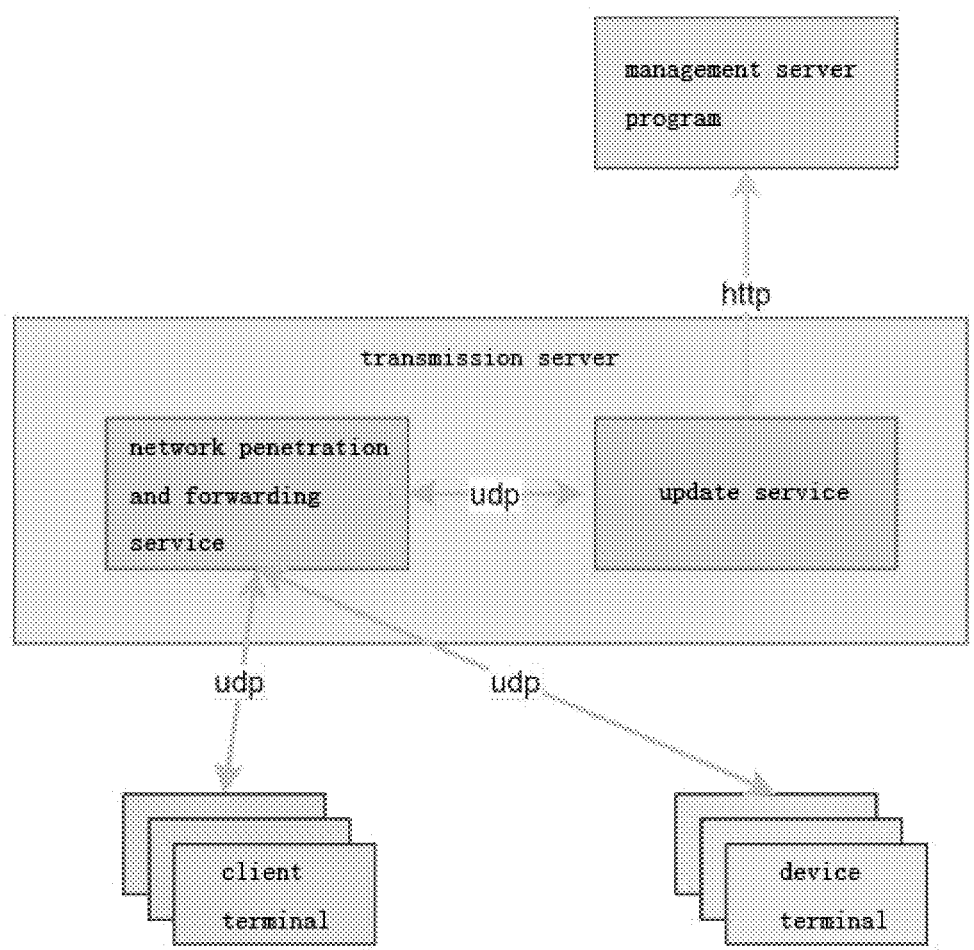
FIG. 3 is a schematic diagram of architecture of the transmission server according to present application.

Referring to FIG. 3, the transmission server is in dynamic adjustment according to the quantity of the device terminals in different areas, the quantity is not limited, when the transmission servers in some areas are overload, the management server conducts the operation of dynamic increase and reduction of the transmission server by a server operator interface; or when the idle server is in high amount, the management server conducts the operation of dynamic increase and reduction of the transmission server by a server operator interface; a detection of the client terminal and the device terminal to network type is omitted in present application, being different from STUN protocol, processes of forwarding and penetration are carried out simultaneously in present application, which means that attempting to penetrate and establishing a forwarding channel are carried out at the same time in a connection process of the client terminal and the device terminal, when the penetration is successful, the forwarding process is stopped, if the penetration is unsuccessful, the forwarding channel is used, when a transmission server undertakes a lot of tasks, it is in high load, the management server will conduct the process of dealing with overload, when a lot of forwarding task in the transmission server stops, the management server will conduct the process of recovering after the overload.

The transmission server includes a network penetration, a forwarding service and an update service, the function of the update service is the same as the register, which is to provide an information interaction to the management server.

For example, when the device scale is 10, the management server, the register server and the transmission server are deployed on an Alibaba Cloud 1-core 1G cloud server at the same time.

For example, when the device scale is 100, the management server and the register server are deployed on a 1-core 1G cloud server, the transmission server is deployed on a 1-core 1G cloud server.

For example, when the device scale exceeds one million, the management server and the register server deploy on a multiple core large memory sever, the register servers are arranged on global network nodes, the transmission server is dynamically deployed in different areas according to the actual situation.

Figure 4:
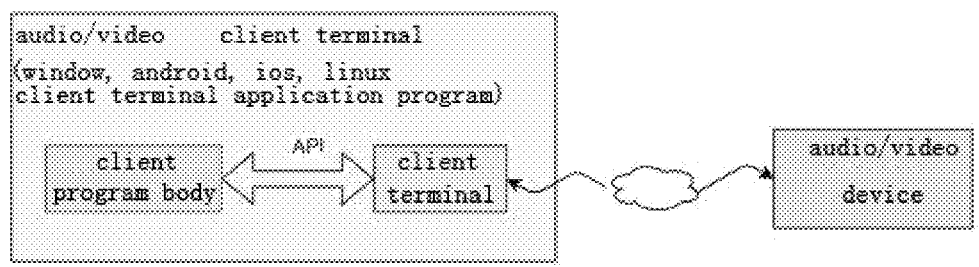
FIG. 4 is a schematic diagram of the client terminal interface according to present application.

Referring to FIG. 4, the client terminal is configured for providing an external program call in a runtime, and completing a connection establishment and a transmission of the audio/video quickly via the API interface of the client terminal.

Figure 8:
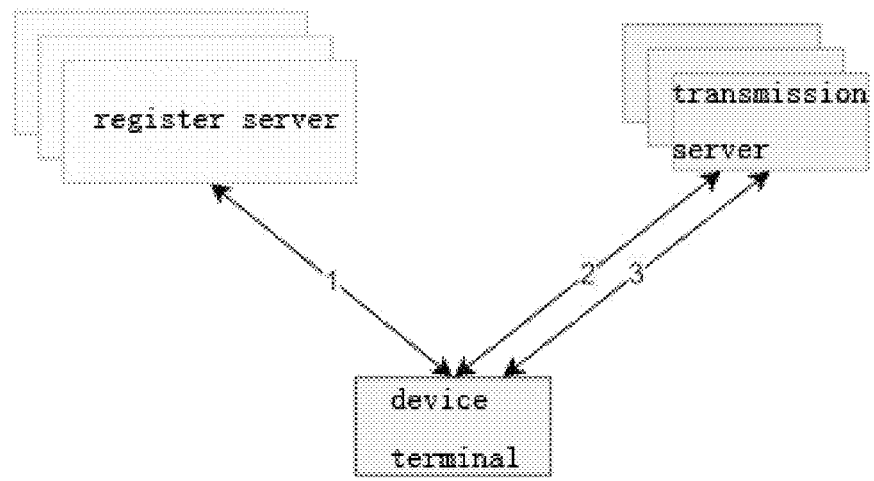
FIG. 8 is a schematic diagram of starting and initializing the device terminal according to present application.

Referring to FIGS. 5 and 8, the device terminal is configured for providing an external program call in a runtime, and completing a connection establishment and a transmission of the audio/video quickly via an existing API interface of the device terminal. The program body of device terminal can quickly implement the end-to-end connection by calling API interface list of device terminal The above is only a preferred embodiment in present application, which is used for helping understand the method of present application and its core idea. The protection scope of present application is not limited to above embodiments, all technical solutions belonging to the idea of present application falls into the protection scope of present application. It should be noted that, for those skilled in the art, several improvements and modifications without departing from the principle of the present application, should be considered as the protection scope of present application.

The present application reduces the whole amount of server deployment, which greatly reduces service operation cost and data transmission cost. Compare with present solution, the error caused by server downtime and network problem is reduced, which has higher reliability. By a self-generated adjustment to the serve amount of the load in the system, the cost of idle server is decreased, which may realize a comprehensive system management to the device and reduce maintenance costs.

What is claimed is:
1. A method for data transmission of audio and video in an end-to-end system, wherein the end-to-end system com- prises a client terminal, a device terminal, and a service terminal, the service terminal comprises a management server, a register server and a transmission server, and the method comprises steps of:

S1: adding the transmission server to the management server;

S2: adding the device terminal to the management server;

S3: starting and initializing the device terminal;

S4: starting the client terminal and connecting the client terminal to the device terminal;

S5: performing an overload processing in the transmission server; and

S6: performing an overload recovery in transmission server, wherein the step S6 comprises:

when a forward link established by the transmission server for the client terminal and the device terminal is terminated, releasing, by the transmission server, a source; when the source of the transmission server reaches a low load threshold, sending, by the transmission server as a low load transmission server, a state message to the management server, and transferring, by the management server, a part of device terminals to the low load transmission server.

2. The method for data transmission of audio and video in an end-to-end system according to claim 1, wherein the step S1 comprises sub-steps of:

S101: adding, by a user, the transmission server on a configuration page of the management server;

S102: saving, by the management server, configuration information to a database;

S103: submitting, by the management server, a creating server application via a cloud service operator;

S104: completing, by the cloud service operator, a creation and a start-up of a new server;

S105: sending, by the new server after the start-up, a register request to the management server; and 5106: updating, by the transmission server, transmission service information to the register server.

3. The method for data transmission of audio and video in an end-to-end system according to claim 1, wherein the step S2 comprises sub-steps of:

S201: adding, by a user, the device terminal on a configuration page of the management server;

S202: saving, by the management server, the added device terminal to a database; and S203: updating, by the transmission server, device information to the register server.

4. The method for data transmission of audio and video in an end-to-end system according to claim 1, wherein the step S3 comprises sub-steps of:

S301: starting the device terminal, and sending, by the device terminal, a register information query message to the register server to obtain a transmission server list corresponding to the device terminal;

S302: after the device terminal obtains the transmission server list, sending, by the device terminal, a register request to the transmission server, and after receiving a registration reply message from the transmission server, completing a registration; and S303: after the registration of the device terminal to the transmission server is completed, sending, by the device terminal, a heartbeat message to the transmission server; a heartbeat reply message sent by the transmission server comprises overload information of the transmission server; when the overload information of the transmission server is received by the device terminal 3 times, sending, by the device terminal, a registration query message to the register server, and when the transmission server list changes, performing the initialization once again.

5. The method for data transmission of audio and video in an end-to-end system according to claim 1, wherein the step S4 comprises sub-steps of:

S401: sending, by the client terminal, a query request for querying transmission server information associated with the device terminal to the register server;

S402: returning, by the register server, the transmission server information of a specified device terminal;

S403: sending, by the client terminal, a second query request to the transmission server;

S404: sending, by the transmission server, a query response to the client terminal;

S405: forwarding, by the transmission server, the second query request of the client terminal to the device terminal;

S406: after the client terminal receives the query response from the transmission server, sending, by the client terminal, a probe message to the device terminal;

S407: after the device terminal receives the second query request forwarded by the transmission server, sending, by the device terminal, a second probe message to the client terminal;

S408: when the second probe message from the device terminal is received by the client terminal, initiating, by the client terminal, a connection request to the device terminal;

S409: when the device terminal receives the connection request from the client terminal, sending, by the device terminal, a connection request response message, wherein a connection establishment is completed when the client terminal receives the connection request response message;

S410: when the client terminal does not receive the second probe message from the device terminal overtime, sending, by the client terminal, a forwarding connection request to a forwarding server;

5411: when the forwarding server receives the forwarding connection request, establishing, by the forwarding server, a forwarding channel to send the forwarding connection request to the device terminal;

S412: when the device terminal receives the forwarding connection request from the forwarding server, sending, by the device terminal, a response message; and S413: receiving, by the client terminal, the forwarding connection request from the forwarding server to complete the connection establishment.

6. The method for data transmission of audio and video in an end-to-end system according to claim 1, wherein the step S5 comprises sub-steps of:

S501: when the transmission server forwards an excessive amount of data or has an excess number of load devices, sending, by the transmission server, an overload message to the management server;

S502: when the transmission server forwards the excessive amount of data or has the excess number of load devices, sending, by the transmission server, a load over-high message to all connected device terminals;

S503: transferring, by the management server, the device terminal of the transmission server with a high load to a transmission server with a low load, and updating the register server with a modified device information list;

S504: after the load over-high message is received by the device terminal for many times, re-requesting, by the device terminal, a device information list to obtain a new transmission server; and S505: migrating, by the device terminal, to a new transmission server with a low load.

7. The method for data transmission of audio and video in an end-to-end system according to claim 1, wherein the management server adopts a standard website architecture design, which is divided into a front end, a back end, and database, the front end is configured for providing a configuration management page to users, the back end is configured for processing a configuration message and a data interaction with other servers, and the database is configured for storing device information.

8. The method for data transmission of audio and video in an end-to-end system according to claim 1, wherein the register server is configured for providing transmission server association information of corresponding device queried by the client terminal and the device terminal.

9. The method for data transmission of audio and video in an end-to-end system according to claim 8, wherein the register server is configured for providing a high concurrency query service and an update service, the high concurrency query service is configured for providing a query function support to the client terminal and the device terminal, and the update service is configured for interacting with the management server by using an http protocol to obtain a device list and a transmission server list.

10. The method for data transmission of audio and video in an end-to-end system according to claim 1, wherein the transmission server is configured for performing a dynamic adjustment according to number of device terminals, when the transmission server is overloaded or a large number of transmission servers are idle, the management server is configured for dynamically increasing and decreasing a number of the transmission servers via a server operator interface.

11. The method for data transmission of audio and video in an end-to-end system according to claim 10, wherein the transmission server has functions of a network penetration, a forwarding service, and an update service, the function of update service is the same as that of the register server, which is configured for providing information interaction with the management server.

12. The method for data transmission of audio and video in an end-to-end system according to claim 1, wherein the client terminal is configured for providing an external program call in a runtime, and completing a connection establishment and a transmission for audio and video via an application programming interface (API) of the client terminal.

13. The method for data transmission of audio and video in an end-to-end system according to claim 1, wherein the device terminal is configured for providing an external program call in a runtime, and completing a connection establishment and a transmission for audio and video via an application programming interface (API) interface of the device terminal.

* * * * *